(No Model.)
E. NORTON.
MACHINE FOR SOLDERING VENT HOLES.
No. 408,253. Patented Aug. 6, 1889.
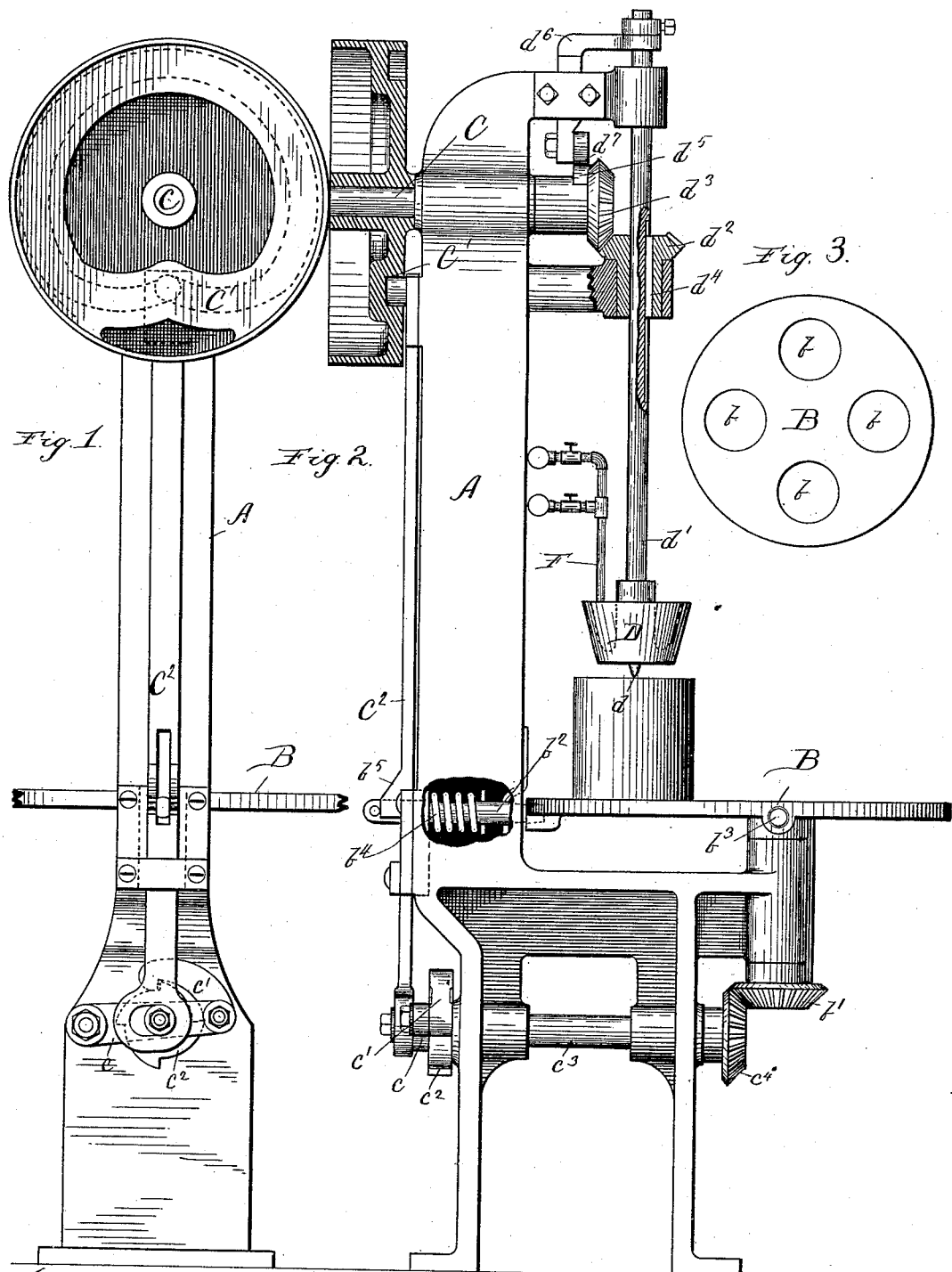
Witnesses:
Geo. E. Curtis
Mack A. Cragin
Inventor:
Edwin Norton
By Munday, Evarts & Adcock
His Attorneys

UNITED STATES PATENT OFFICE.

EDWIN NORTON, OF MAYWOOD, ASSIGNOR TO HIMSELF, AND OLIVER W. NORTON, OF CHICAGO, ILLINOIS.

MACHINE FOR SOLDERING VENT-HOLES.

SPECIFICATION forming part of Letters Patent No. 408,253, dated August 6, 1889.

Application filed October 1, 1888. Serial No. 286,918. (No model.)

*To all whom it may concern:*

Be it known that I, EDWIN NORTON, a citizen of the United States, residing at Maywood, in the county of Cook and State of Illinois, have invented a new and useful Improvement in Machines for Soldering Vent-Holes in Cans, of which the following is a specification.

The object of my invention is to provide a machine of a simple and cheap construction for soldering vent-holes in cans.

My invention consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation of a machine embodying my invention. Fig. 2 is a front view, and Fig. 3 a detail plan view, of the can-holder turret.

In said drawings, A represents the frame of the machine.

B is an intermittently-revolving turret or disk provided with a series of can holders or recesses $b$ to receive the cans the vent-holes of which are to be soldered. This turret is intermittently revolved from the driving-shaft C by means of a cam $C'$ thereon, which operates a pawl-lever $c$, the pawl $c'$ of which engages the ratchet-wheel $c^2$ on the counter-shaft $c^3$, the counter-shaft $c^3$ having a bevel-gear $c^4$, which meshes with a bevel-gear $b'$ on the shaft of the turret. The pawl-lever $c$ is operated from the cam $C'$ by means of a sliding connecting-bar $C^2$. The turret B is locked in position, so that the can thereon will properly register with the soldering-tool D by means of a locking-bolt $b^2$, which engages suitable locking devices or recesses $b^3$ on the turret B. The locking-bolt $b^2$ is forced into engagement with the turret by a spring $b^4$, and it is withdrawn at proper intervals by a cam $b^5$ on the sliding bar $C^2$.

The soldering-tool D has a tip $d$ on its lower face suitable for soldering the vent-hole of a can. The tool is secured to or made integral with a vertically-sliding revoluble shaft $d'$. The shaft $d'$ is given its revolving motion by means of a bevel-gear $d^2$ thereon, which meshes with a bevel-gear $d^3$ on the driving-shaft C. The shaft $d'$ is connected by a spline $d^4$, or other equivalent means, with its gear $d^2$, so that it may slide through said gear. The soldering-tool is given its reciprocating motion by means of a cam $d^5$ on the shaft C, which engages an arm $d^6$, connected to the shaft $d'$. The arm $d^6$ is or should be provided with a friction-roller $d^7$ to bear against the cam. The soldering-tool D is heated by a gas-jet F, or other suitable heater.

By substituting an annular-faced soldering-tool adapted to fit the cap-groove in the can the same machine may be used for soldering on the caps.

The turret B, as shown in the drawings, is provided with four can holders or recesses $b$. It may, however, be furnished with a greater or less number, if desired.

The soldering-tool D is furnished with an annular cavity in its upper end for the reception of the flame from the burner F. This annular cavity is indicated by the dotted lines in Fig. 2. By the revolution of the soldering-tool D the flame from the burner is projected equally into every part of the annular cavity in the tool D, so that it is heated uniformly.

I claim—

1. The combination, with an intermittently-revolving turret furnished with can-holders, of mechanism for intermittently revolving said turret, a revolving vertically-reciprocating soldering-tool provided with an annular cavity in its upper end to receive and confine the flame, the walls of said cavity being imperforate, so that the flame will not be projected through the soldering-tool, mechanism for reciprocating and revolving said tool, and a burner F, for projecting the flame into said annular cavity and heating said tool as it revolves, substantially as specified.

2. The combination, with a can-holder, of a soldering-tool having a revoluble sliding shaft $d'$, gears $d^2$ $d^3$, shaft C, and cam $d^5$, said shaft $d'$ having an arm or projection engaging said cam for revolving and reciprocating said soldering-tool, substantially as specified.

3. The combination, with shaft C, having cam $C'$, of connecting-rod $C^2$, pawl-lever $c$, pawl $c'$, ratchet $c^2$, shaft $c^3$, bevel-gear $c^4$, and can-holder turret B, having gear $b'$ on its shaft meshing with said gear $c^4$, substantially as specified.

4. The combination, with shaft C, having cam $C'$, of connecting-rod $C^2$, pawl-lever $c$, pawl $c'$, ratchet $c^2$, shaft $c^3$, bevel-gear $c^4$, and can-holder turret B, having gear $b'$ on its shaft meshing with said gear $c^4$, said turret having recesses $b^3$, a locking-bolt $b^2$, spring $b^4$, and a cam $b^5$ on said connecting-rod $C^2$, substantially as specified.

5. The combination, with shaft C, having cam $C'$, of connecting-rod $C^2$, pawl-lever $c$, pawl $c'$, ratchet $c^2$, shaft $c^3$, bevel-gear $c^4$, and can-holder turret B, having gear $b'$ on its shaft meshing with said gear $c^4$, soldering-tool D, its sliding shaft $d'$, gear $d^2$, gear $d^3$ on said shaft C, cam $d^5$, and arm $d^6$, secured to said shaft $d'$, substantially as specified.

6. The combination, with shaft C, having cam $C'$, of connecting-rod $C^2$, pawl-lever $c$, pawl $c'$, ratchet $c^2$, shaft $c^3$, bevel-gears $c^4$, and can-holder turret B, having gear $b'$ on its shaft meshing with said gear $c^4$, said turret having recesses $b^3$, a locking-bolt $b^2$, spring $b^4$, a cam $b^5$ on said connecting-rod $C^2$, soldering-tool D, its sliding shaft $d'$, bevel-gear $d^2$, bevel-gear $d^3$ on said shaft C, cam $d^5$, and arm $d^6$, secured to said shaft $d'$, substantially as specified.

EDWIN NORTON.

Witnesses:
H. M. MUNDAY,
EDMUND ADCOCK.